United States Patent Office 2,828,244
Patented Mar. 25, 1958

2,828,244

STABILIZED DIETHYLSTILBESTROL DIPHOSPHATE SOLUTION AND METHOD OF PREPARING SAME

Dale E. Fonner and Galen F. Collins, Elkhart, Ind., assignors to Miles Laboratories, Inc., Elkhart, Ind., a corporation of Indiana No Drawing. Application January 24, 1957
Serial No. 635,932

6 Claims. (Cl. 167—65)

The present invention relates to the production of heat-sterilized stable solutions of salts of diethylstilbestrol diphosphate and more particularly to the preparation of heat-sterilized ampuled solutions of salts of diethylstilbestrol diphosphate which are stable against the formation of sediments and precipitates therein.

Ampuled solutions of salts of diethylstilbestrol diphosphate which have heretofore been available commercially have suffered from a number of disadvantages exemplified by the following:

Heat or steam sterilization of the ampuled solutions of salts of diethylstilbestrol diphosphate results in the formation of a heavy precipitate which becomes more pronounced with the passage of time. The product in this form cannot, of course, be used and it has consequently been necessary that the ampules be produced by aseptic filling, with all of the difficulties, expense and hazards associated with this method. And even when the ampules are aseptically filled, the contents appear to break down in some fashion at room temperature and produce, over a rather short period of time, sufficient precipitated material to make the product unacceptable by the medical profession.

We have found that the stability of solutions of salts of diethylstilbestrol diphosphate against the formation of precipitates, is increased to a marked degree by preparing such solutions in the pH range of from 9 to 11, and particularly at about a pH of 10. This is an unexpected phenomenon since it is well known that esters are hydrolized more rapidly in either an acid or alkaline media than in neutral media.

The usable salts of diethylstilbestrol diphosphate can be made by neutralizing the diethylstilbestrol diphosphate with sodium hydroxide, potassium hydroxide, and equivalent alkalis, or mixtures thereof, the mixtures desirably being in the proportion to produce sodium-potassium ratios such as are present in body fluids.

We have found that solutions prepared in accordance with our invention, can be sterilized, preferably in the form of ampules, by the customary process of autoclaving at 15 p. s. i. for fifteen minutes and that any tendency to form precipitates during processing is eliminated.

It has been determined that the shelf life of ampuled solutions of salts of diethylstilbestrol prepared in accordance with our technique is astonishingly greater than the shelf life of the present commercial ampuled solutions, and that, as determined by rapid aging techniques, our method of preparation provides solutions which will give 50 to 100 times greater shelf life than the present commercial ampuled solutions. As a consequence, ampuled solutions prepared in accordance with our invention can be used for intravenous injection long after those presently known and in use.

Preferred embodiments of our inventions are set forth in the following examples:

EXAMPLE I

1.0 normal sodium hydroxide, made using pyrogen-free water, was added with stirring, to dry diethylstilbestrol diphosphate until all of the latter was in solution and the addition of alkali was continued until a pH of 10 was reached. Pyrogen-free water was then added to make the required volume, the pH again checked and if necessary adjusted by the addition of a small amount of alkali, the solution sealed in glass ampules and the ampules heat-sterilized in an autoclave. In order to raise the pH of 5 ml. of solution containing 250 mgm. of diethylstilbestrol diphosphate, representing the contents of an ampule, from 7.5 to 10, an amount of alkali equivalent to 0.15 ml. of 1.0 normal sodium hydroxide was required, indicating that the solution is not highly buffered in this range.

It appears that the sedimentation which appears in solutions of salts of diethylstilbestrol diphosphate results from a breaking-down of the diethylstilbestrol diphosphate to diethylstilbestrol monophosphate and diethylstilbestrol, the former being the bulk of the precipitate. We have set forth in Table I below, tabular data illustrating the stability of solutions of sodium salts of diethylstilbestrol diphosphate compounded at different pH's, some of which solutions have, as indicated, been autoclaved.

Checking of the decomposition has been accomplished using a modified U. S. P. XIV procedure for the determination of diethylstilbestrol. We have found that the diethylstilbestrol diphosphate gives no color with this method while conversely, the diethylstilbestrol and the diethylstilbestrol monophosphate both give a measurable blue color. The results quoted in Table I give a combined figure for "free diethylstilbestrol" which means that the amounts of diethylstilbestrol-diethylstilbestrol monophosphate in the solution tested give a combined color equal to that obtained from a standard solution containing the quoted amount of diethylstilbestrol. The results are given as milligrams of "free diethylstilbestrol" per 5 ml. of solution which contained, when freshly prepared, 250 mg. of diethylstilbestrol diphosphate per 5 ml. The accelerated aging tests are carried out using various times and conditions of storage; however, those stored at 120° F., are given in Table I as an indication of the relative stabilities. The other areas of storage including room temperature parallel the results found at 120° F., but the break-down is slower at lower temperatures.

*Table I*
"FREE DIETHYLSTILBESTROL"/5 ML. SOLUTION

|  | Original Assays, milligrams | Two Weeks' Storage, milligrams |
|---|---|---|
| pH 6.6 aseptically filled | .62 | 15.50 |
| pH 9 aseptically filled | .41 | .60 |
| pH 9 autoclaved | 3.50 | 4.00 |
| pH 10 autoclaved | 1.35 | 1.35 |
| pH 11 autoclaved | .88 | .80 |
| Commercial Sample pH 7.5 | 2.48 | 5.40 |
| Commercial Sample pH 7.5 autoclaved | Heavy Precipitate | |

|  | One Year Storage, milligrams |
|---|---|
| pH 6.6 aseptically filled | 9.75 |
| pH 10 autoclaved | 1.24 |
| pH 11 autoclaved | .81 |
| Commercial Sample pH 7.5 aseptically filled | 3.63 |

It will be noted from the above that at pH 6.6 there was extremely rapid decomposition. At a pH of 9, the decomposition had been slowed considerably, but there was still a rather high initial decomposition during sterilization. At pH 10 and 11, initial decomposition was relatively low and decomposition with age at the storage temperature had practically ceased.

The commercial product, as is seen, precipitated very badly with autoclaving and in addition the commercial product, unautoclaved, had a fairly rapid decomposition rate when maintained at an accelerated aging temperature.

It has been determined that the shelf life of ampuled solutions of salts of diethylstilbestrol prepared in accordance with our technique is astonishingly greater than the shelf life of the present commercial ampuled solutions, and that, as determined by rapid aging techniques, our method of preparation provides solutions which will give 50 to 100 times greater shelf life than the present commercial ampuled solutions.

While we have chosen particular embodiments described above as illustrative of our invention, it will be apparent that various embodiments may be made without departing from the spirit and scope of our invention and these embodiments are likewise included in the appended claims.

This application is a continuation-in-part of Ser. No. 455,782, filed September 13, 1954, now abandoned.

We claim:

1. A composition which is stable against the development of sediment therein comprising an aqueous solution of an alkali salt of diethylstilbestrol diphosphate said solution having a pH of from about 9 to 11 inclusive.

2. An aqueous solution of an alkali salt of diethylstilbestrol diphosphate, said solution having a pH of approximately 10.

3. A method of producing an aqueous solution containing diethylstilbestrol diphosphate characterized by its being stable against the development of a precipitate therein after said solution is heat-sterilized and ampuled, which comprises contacting the diethylstilbestrol diphosphate with sufficient alkali to bring the pH of a solution thereof to between about 9 to 11.

4. Heat-sterilized material comprising an aqueous solution of a salt of diethylstilbestrol diphosphate formed by reacting diethylstilbestrol diphosphate with sufficient alkali to impart to said solution a pH of about 10.

5. Heat-sterilized material comprising an aqueous solution of a salt of diethylstilbestrol diphosphate formed by reacting diethylstilbestrol diphosphate with sufficient sodium hydroxide to impart to said solution a pH of about 10.

6. Heat-sterilized material comprising an aqueous solution of a salt of diethylstilbestrol diphosphate formed by reacting diethylstilbestrol diphosphate with sufficient potassium hydroxide to impart to said solution a pH of about 10.

References Cited in the file of this patent

UNITED STATES PATENTS 2,234,311    Miescher   ---------------- Mar. 11, 1941

OTHER REFERENCES

Chemical Abstracts, vol. 22, 1948, p. 673e.